Dec. 29, 1925.    L. L. WHITNEY    1,567,354
METHOD OF FORGING DOUBLE JAWS
Filed July 14, 1924    2 Sheets-Sheet 1
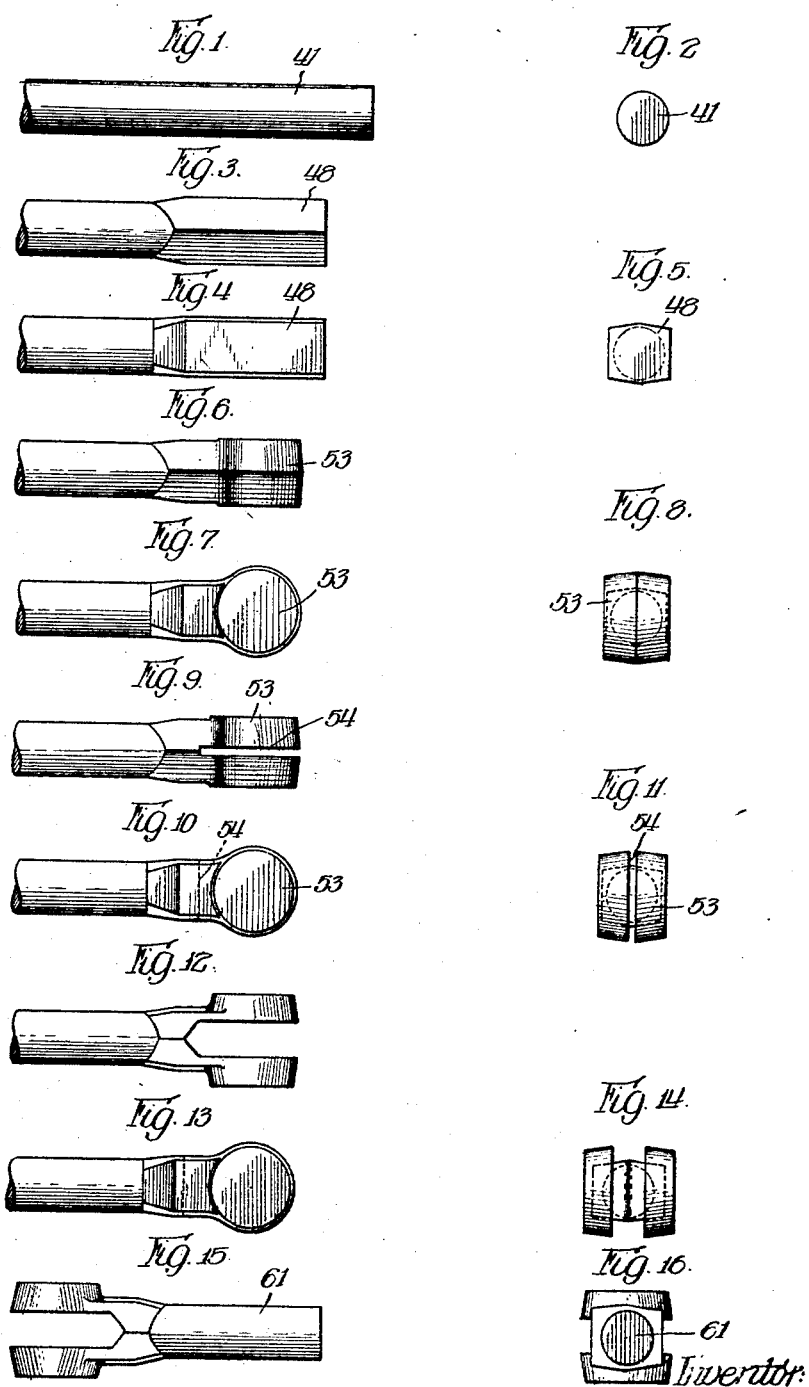

Dec. 29, 1925. 1,567,354
L. L. WHITNEY
METHOD OF FORGING DOUBLE JAWS
Filed July 14, 1924  2 Sheets-Sheet 2
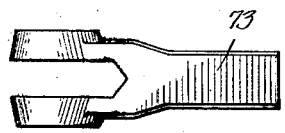
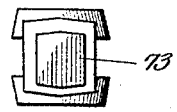
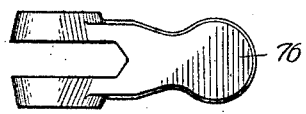
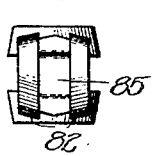
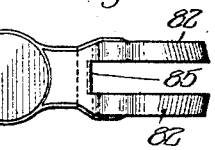
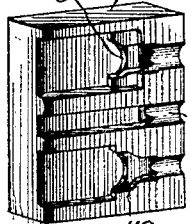
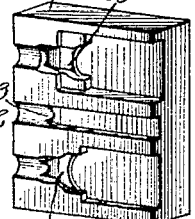
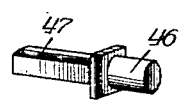
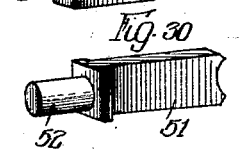
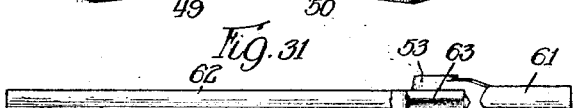
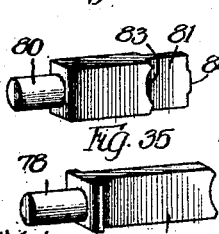
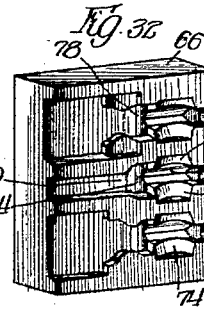
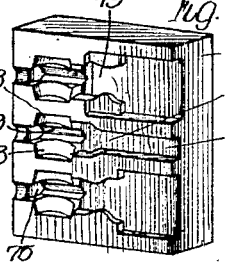
Inventor:
Loren L. Whitney Patented Dec. 29, 1925.

1,567,354

UNITED STATES PATENT OFFICE.

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

METHOD OF FORGING DOUBLE JAWS.

Application filed July 14, 1924. Serial No. 725,768.

*To all whom it may concern:*

Be it known that I, LOREN L. WHITNEY, a citizen of the United States, residing at Hammond, in the county of Lake and State of Indiana, have invented certain new and useful Improvements in Methods of Forging Double Jaws, of which the following is a specification.

This invention relates to a new and improved method of forming double jaws and more particularly to a method of forming double jaws of a type adapted for use with railway brake assemblies.

Jaws of this type comprise two pairs of jaws extending in planes at right angles to each other but having a common axis. One pair of jaws is commonly called the rivet end and the other pair of jaws the pin end of the double jaws.

It is an object of the present invention to provide a method of making double jaws of this character, which method comprises a series of forging operations.

It is a further object to provide a method whereby the blank or stock for one pair of jaws serves as a holder during the formation of the other pair and whereby the first formed pair are utilized for holding purposes during the formation of the second pair.

It is an additional object to provide a method whereby the first formed jaws are protected against deformation during the formation of the second pair of jaws.

Other and further objects will appear as the description proceeds.

In the drawings I have shown the stock in various stages of the formation of the jaws, together with the dies used in the process.

In the drawings:—

Figure 1 is a side elevation of the stock or blank used;

Figure 2 is an end view of Figure 1;

Figure 3 is a plan view of the blank after the first forging operation;

Figure 4 is a side view of Figure 3;

Figure 5 is an end view of Figure 3;

Figures 6, 7 and 8 are views similar to Figures 3, 4 and 5 but after the second forging operation;

Figures 9, 10 and 11 are views similar to Figures 3, 4 and 5 after the hot sawing operation;

Figures 12, 13 and 14 are views similar to Figures 3, 4 and 5 after the third forging operation;

Figure 15 is a side elevation of the stock cut away with the pin end completed;

Figure 16 is an end view showing the stock used in forming the rivet end;

Figure 17 is a view similar to Figure 15 showing the stock after the first forging operation in forming the rivet end;

Figure 18 is an end view of the rivet end of Figure 17;

Figure 19 is a view similar to Figure 17 after the second forging operation;

Figure 20 is an end view of the rivet end of Figure 19;

Figure 21 is a view similar to Figure 19 after the hot sawing operation;

Figure 22 is an end view of the rivet end of Figure 21;

Figure 23 is a side view of the completed double jaw;

Figure 24 is a view of Figure 23 as seen from the right;

Figure 25 is a view of Figure 23 as seen from above;

Figures 26 and 27 are perspective views of the dies used in forming the pin end;

Figures 28, 29 and 30 are perspective views of the plungers used in forming the pin end;

Figure 31 is an elevation of the mandrel used in supporting the stock during the formation of the rivet end, the stock being shown supported thereon;

Figures 32 and 33 are perspective views of the dies in forming the rivet end; and Figures 34, 35 and 36 are perspective views of the plungers used in forming the rivet end.

The stock used in forming the double jaws consists of the rod 41 which is circular in cross section, as shown in Figure 2. As the first step in forming the pin end of the double jaws, the end of the stock is heated and it is placed within the cavities 42 and 43 of the dies 44 and 45 shown in Figures 26 and 27. These dies are brought together and the plunger 46 has its portion 47 forced into the die recesses and against the end of the blank. The end of the blank is thickened and shortened and brought to the contour of the recesses which contour is shown at 48 in Figures 3 to 5.

The heated and deformed end of the blank is next placed in the recesses 49 and 50 of the dies and the portion 51 of the plunger 52 is forced into the dies deforming the metal and bringing it to the contour shown at 53 in Figures 6 to 8. The partly formed jaws are now sawed through by a hot sawing operation to produce the slot 54 shown in Figures 9, 10 and 11.

The heated and sawed end of the blank is then placed between the recesses 55 and 56 of the dies and the plunger 57 shown at Figure 28 is forced into die recesses. The portion 58 of the plunger enters the saw slot 54 of the blank and separates the sawed apart portions, the pointed entrance edge 59 of the plunger facilitating its entry. The rounded portion 60 of the plunger maintains the edges of the jaws in their rounded formation.

This completes the formation of the pin end or pin pair of jaws and the stock is now cut off to allow a portion 61 of suitable size for forming the rivet jaws to remain attached to the pin jaws already formed. The partly formed jaws are supported upon the mandrel 62, the flat portion 63 of which is introduced between the pin jaws 53 as shown in Figure 31. This mandrel serves as a holder and is handled in the usual way by the forging machine operator.

The heated blank is then placed in recesses 64 and 65 of the dies 66 and 67 shown in Figures 32 and 33. The pin jaws 53 fit into the portions 68 of the recesses and the flat portion 63 of the mandrel fits into portions 69 of the recesses. The unformed portion 61 of the blank extends out into the portions 70 of the recesses. The portion 71 of the plunger 72 shown in Figure 36 is next introduced into recesses 64 and 65 and forced against the end of the blank 61. This end of the blank is brought to the form shown at 73 in Figures 17 and 18.

The blank is next placed in the recesses 74 and 75 of the dies and the end of the blank is brought to the form shown at 76 in Figures 19 and 20, by means of force applied by the portion 77 of the plunger 78, shown in Figure 35. The portions 76 are then hot sawed to separate them by the saw cut 77 as shown in Figures 21 and 22.

In the final forging operation in the formation of the rivet end or rivet pair of jaws, the blank supported upon the mandrel is placed in the upper recesses 78 and 79 of the dies. The plunger 80 shown in Figure 34 is introduced into the recesses and force against the end of the blank. The portion 81 of the plunger enters the saw cut 77 and separates the jaws 82 to bring them to the form in which they are shown in Figure 25. The curved portion 83 of the plunger 80 maintains the contour of the jaws.

It should be noted that the portion 81 of the plunger 80 is provided with a raised and rounded central portion 84. This portion is of very material assistance in causing the front edge of the portion 81 to enter into the saw cut 77 and separate the jaws without scraping and tearing the inside surfaces of the cut. It is impractical to use a pointed entering edge on the portion 81 similar to the edge 59 shown on the plunger 57 in Figure 28, as there is a limited distance between the rivet and pin holes and it is necessary that the corners 85 as shown in Figure 25 be square since the surface between these corners must bear against the bar to which the jaws are secured.

The jaws may next be drilled in any suitable manner to receive the pins and rivets by which they are to be connected to the other elements of the brake assembly.

I claim:

1. The method of forming double jaws or the like, which comprises forming jaws on one end of a blank, and supporting said jaws by a mandrel and die recesses while forming jaws upon the opposite end of the blank whereby deformation of the first formed jaws is prevented.

2. The method of forming double jaws or the like, which comprises sawing one end of a blank, increasing the separation of the saw cut by a forging operation, inserting a mandrel into the cut, the mandrel serving as a holder and to prevent closure of the cut, and similarly forming jaws upon the opposite end of the blank.

3. The method of forming double jaws or the like, which comprises forming jaws on one end of a blank, the jaws having a pointed bottom to the recess, and forming jaws upon the opposite end of the blank in a plane having an angular relation to that of the first set of jaws, the recess between the second set of jaws having a square bottom whereby members fitted on the jaws may be in closely adjacent relation.

4. The method of forming double jaws or the like, which comprises forming jaws on one end of the blank by a forging operation, and forming jaws upon the opposite end of the blank by means of a sawing and forging operation, separating the saw cut by means of a plunger having a flat faced, rounded edged entering protuberance whereby the bottom of the second jaw recess is squared.

5. The method of forming double jaws or the like, which comprises forming jaws on one end of the blank by a forging operation giving the jaw recess a pointed bottom, inserting a mandrel into the recess, the mandrel serving to prevent deformation of the recess and as a holder in subsequent operations, and forming jaws upon the opposite end of the blank by means of a sawing and forging operation, separating the saw cut by means of a plunger having a flat faced, rounded edged entering protuberance whereby the bottom of the second jaw recess is squared.

Signed at Hammond, Indiana, this 9th day of July, 1924.

LOREN L. WHITNEY.